United States Patent [19]

Saarela et al.

[11] Patent Number: 5,045,973

[45] Date of Patent: Sep. 3, 1991

[54] PROCEDURE FOR MANUFACTURING A RADIO TELEPHONE CHASSIS AND A CHASSIS MANUFACTURED ACCORDING TO THIS PROCEDURE

[75] Inventors: Matti J. Saarela, Halikko; Lasse J. Uronen, Salo; Heikki A. J. Salo, Teijo, all of Finland

[73] Assignee: Nokia Mobile Phones Ltd., Salo, Finland

[21] Appl. No.: 473,922

[22] Filed: Jan. 31, 1990

[30] Foreign Application Priority Data

Feb. 3, 1989 [FI] Finland .................................. 890543

[51] Int. Cl.$^5$ ........................... H05K 1/14; H05K 3/36
[52] U.S. Cl. ...................................... 361/395; 29/830;
29/600; 72/379.2; 174/35 R; 361/399; 361/424
[58] Field of Search ............................ 174/52.1, 35 R;
361/394, 395, 399, 421, 412, 424; 334/85;
29/600, 830; 72/379.2, 379.4

[56] References Cited

U.S. PATENT DOCUMENTS

| | | | |
|---|---|---|---|
| 3,814,911 | 6/1974 | Knappenberger | 174/52.1 X |
| 4,092,698 | 5/1978 | Bretka | 361/346 X |
| 4,152,671 | 5/1979 | Tuma et al. | 174/35 R X |
| 4,471,898 | 9/1984 | Parker | 361/394 X |
| 4,752,861 | 6/1988 | Niggl et al. | 361/394 X |
| 4,791,717 | 12/1988 | Hemmie | 361/394 X |
| 4,841,414 | 6/1989 | Hibino et al. | 361/399 X |
| 4,903,169 | 2/1990 | Kitagawa et al. | 361/399 X |
| 4,945,633 | 8/1990 | Hakanen et al. | 361/399 X |

FOREIGN PATENT DOCUMENTS 1240960 5/1967 Fed. Rep. of Germany ...... 361/400

Primary Examiner—Carl J. Arbes
Attorney, Agent, or Firm—Darby & Darby

[57] ABSTRACT

A procedure for manufacturing a radio telephone chassis and for mounting circuit boards on the chassis, and a radio telephone chassis produced according to the procedure. The chassis is made from a sheet metal blank by suitably die cutting and bending it into a box-shaped body, the circuit boards attached thereto constitute one set of walls. Before mounting the circuit boards, the metal board is coated with a thin layer of tin.

14 Claims, 2 Drawing Sheets

5,045,973

PROCEDURE FOR MANUFACTURING A RADIO TELEPHONE CHASSIS AND A CHASSIS MANUFACTURED ACCORDING TO THIS PROCEDURE

BACKGROUND OF THE INVENTION

The present invention relates to a procedure for manufacturing a chassis for a radio telephone, for attaching circuit boards on the chassis, and a chassis made according to this procedure.

Various radio telephone chassis are known in the art on which the circuit boards of the radio telephone are attached. Such chassis are usually cast or pressed chassis of aluminium provided with thicker points, or 'towers', in which a threaded hole has been made for fixing the circuit board thereon with a screw or threaded bolt to form a screw joint. Similarly, the chassis are provided with 'towers' on which the shell components of the apparatus are likewise fixed applying by means of a screw joint, when assembling the radio telephone. The fixing can be carried out self-tapping screws.

Chassis of the type known in the art are subject to certain drawbacks. The aluminium chassis is rather expensive to manufacture, in particular when a cast chassis is used. Drilling and threading the holes for the fixing screws add work steps and consequently, costs. Fixing RF shielding covers and achieving good sealing is also problematic. A radio telephone chassis of the kind known in the art constitutes an entity together with the outer shell intended to be affixed thereto. This implies that since the fixing is done with screw joints, the chassis on which the circuit boards have been attached and the shell must be mutually consistent at the fixing points. Hence, it follows that a particular shell only can be used with a given chassis. Said feature restricts the number of the external modifications of the apparatus. Whenever one desires to produce a radio telephone of novel appearance, it becomes necessary to design a new chassis to go with it.

SUMMARY OF THE INVENTION

In the present invention a procedure has been provided for manufacturing a chassis for a radio telephone, the chassis produced according to this procedure being relieved of the above drawbacks. The invention is characterized in that the chassis is punched out of a sheet or board blank in such a manner that strip-like parts and a plurality of tongues are created. The strip-like parts and marginal areas of the board blank are bent 90° to form a box-like chassis with the strip-like parts on the bottom. A first circuit board is supported by the strip-like part and a second circuit board is supported about the first by the tongues.

The present invention results in a chassis having low manufacturing costs and upon which the circuit boards can be attached without screw joints, even though screw joints may be employed if desired. The chassis can be enclosed in a plastic outer shell which has been designed so that in the final assembly of the radio telephone not a single screw is necessarily used.

The plastic shell may be variable appearance, while the body part to which the circuit boards have been attached is always the same. Producing new modifications is hereby restricted merely to mechanical designing of the plastic shells. This substantially reduces the manufacturing costs because with different shells one and the same electronics assembly can be used, which assembly may have already been tested functionally and has its RF shielding in order.

BRIEF DESCRIPTION OF THE DRAWINGS

The invention is described more in detail with the aid of the figures attached, in which.

DESCRIPTION OF AN ILLUSTRATIVE EMBODIMENT

Figure 1:
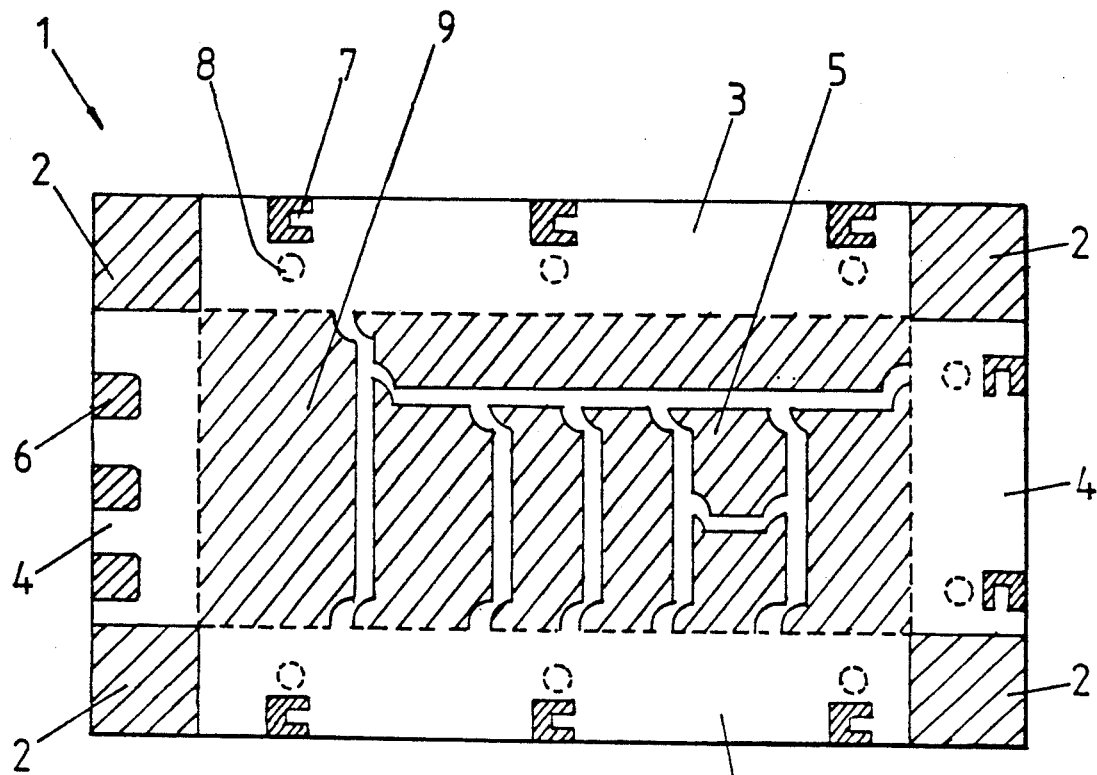
FIG. 1 illustrates sheet blank from which a chassis according to the invention is made by die cutting and bending.

In FIG. 1, reference numeral 1 refers to a board blank which in the present instance is a rectangular, thin metal sheet. The corners 2 are removed from the board blank 1 by die cutting. From the region which, after bending marginal parts 3 and 4 will constitute the bottom part of the chassis, the areas 9 are similarly removed by die cutting (only one area indicated). Likewise, requisite areas 6 are removed from one margin of the board 1. Similarly an appropriate number of punchings 8 are made and tongues 7 are cut in the remaining marginal parts 3 and 4 close to the edges of the board, their purpose being described later. In FIG. 1, the areas to be removed are shown with diagonally hatched lines. The main bending lines are shown with interrupted lines. After the die cutting is completed, the end parts 4 and side parts 3 forming the side walls of the future chassis, and the bottom part confined by these are visible in the board blank 1. From the bottom part the greater part of the board material has been removed, as can be seen in FIG. 1, so that only fairly narrow strip-like parts 5 remain. The shape of the strip-like parts 5 is very important. First, their breadth is the same or slightly larger than the height of the piece component extending farthest from the surface of the circuit board. Secondly, those points where the strip-like parts join one another and the side parts 3 and end parts 4 have been cut to such shape that the strip-like parts can be bent 90 degrees about their longitudinal axis. When the board blank has been die cut in one or several work steps, the bending step follows. Bending takes place such that e.g., in the plane of FIG. 1 the marginal parts 3 and 4 of the board blank are bent along the interrupted main bending lines 90° upward from the picture plane and the strip-like parts. Hereby, a rectangular box, is formed with 'a rib system' 5 on the bottom part, and the longitudinal sides are composed of the side parts 3 and the end short sides of the parts 4. One short side 4 is provided with one or several notches 6 at its outermost edge. The above-mentioned strip-like parts 5 in the bottom part are bent 90 degrees about their longitudinal axis towards the box interior. In this manner a rib system in the bottom part of the box is formed, the breadth of each rib being equal to the material thickness of the metal forming board blank 1 and its height being equal to the breadth of the strip-like part 5 produced in the die cutting step. One edge of the rib system is located on the same level as the edge of the parts 3 and 4 after bending.

The box produced after the bending is coated with tin on both sides. This coating may equally be performed prior to bending. It is also possible to use pre-tinned sheet material. A thin tin coating protects the sheet metal from corrosion and is useful when the corner parts of the box are soldered and when the circuit boards are soldered to the box as will be described further below.

Figure 3:
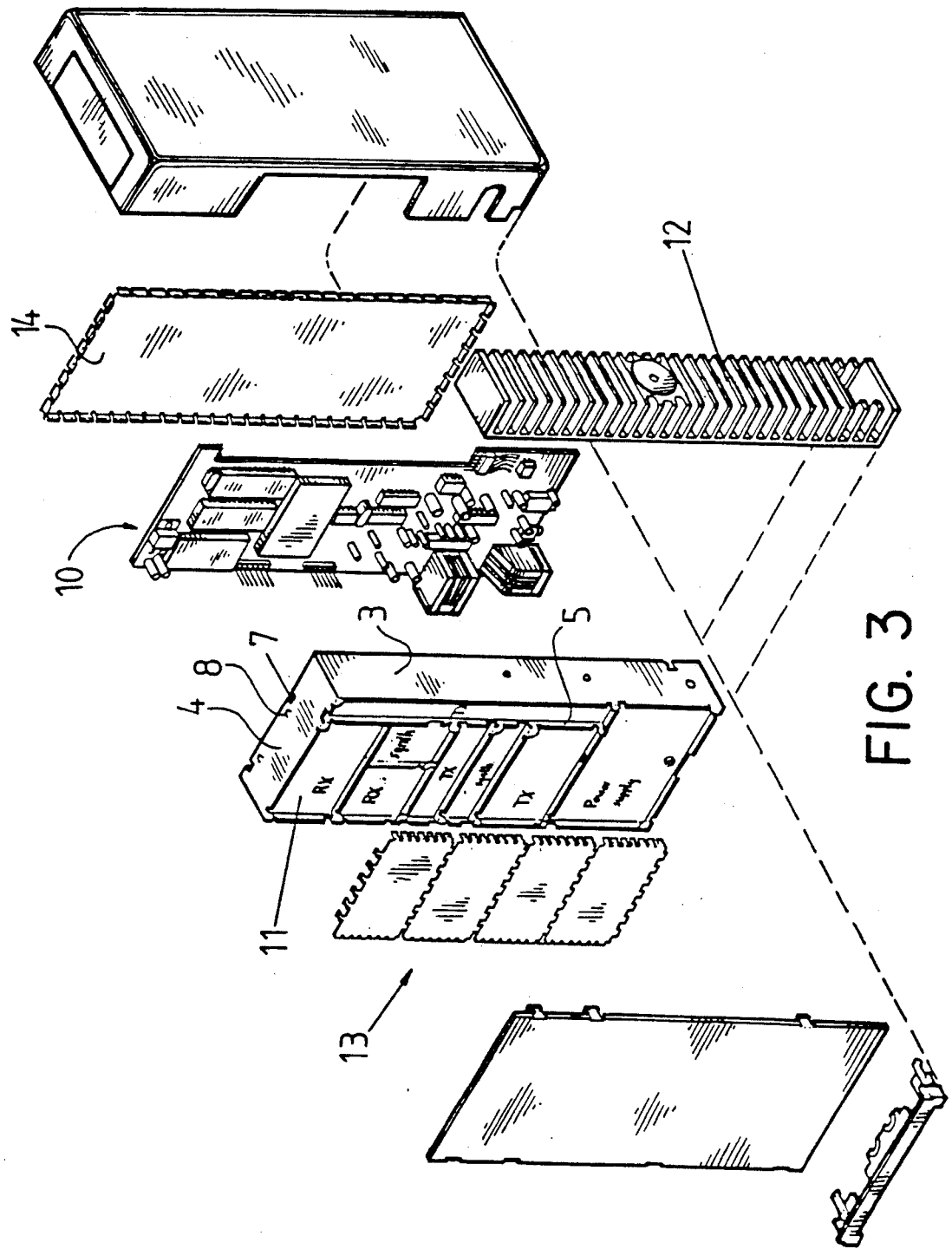
FIG. 3 is an exploded view of the radio telephone.

After producing the box structure, the circuit boards 10 and 11 (FIG. 3) upon which the requisite components of the radio telephone are fixed are attached. The components include the audio frequency processing unit, a logic unit, a synthesizer producing the radio frequencies, a transmitter, a receiver and a power supply. All of the component parts of the radio telephone are positioned on these two circuit boards. The circuit boards 10 and 11 are interconnected electrically with connectors some of which are in part visible in FIG. 3. The circuit board 11 is first installed on the bottom of the box constituting the chassis so that the piece components of the radio frequency sections are in the front, and the components of the other parts and the connectors remain inside the box. The dimensions of the circuit board 11 conform to the inner dimensions of the box. Laterally the circuit board 11 is supported by the side walls 3 and 4 of the box formed by side parts 3 and end parts 4, and vertically it is supported by the bent strip like parts 5 so that the breadth of the strip like part 5 touching the circuit board is the same as the thickness of the board blank 1. Thereafter the circuit board is soldered, either partially or completely, to the strip-like parts 5 and to the sides of the box forming the chassis.

In the same work step the adjacent marginal parts 3 and 4 which after being bent form the sides of the box are soldered together along the corner formed by said sides.

In the next step, the cooling fin 12 (FIG. 3) required for cooling the power stage of the telephone is fixed on the outer surface of one of side parts 3 of the box forming the chassis. An antenna connector has heretofore been attached to the cooling fin.

Figure 2:
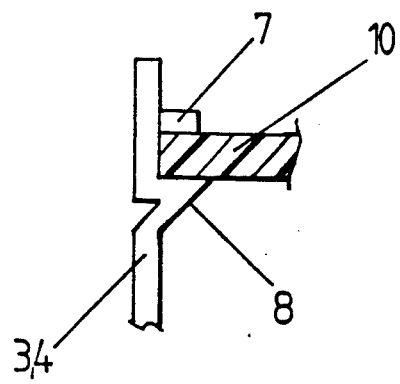
FIG. 2 shows a detail of the attachment of a circuit board to the chassis.

Thereafter the circuit board 10 is mounted. As was mentioned before, protrusions 8 have been punched in the die cutting phase. The protrusions are made such that when the board blank 1 is bent into box form, the protrusions 8 remain inside the box. The circuit board 10, its dimensions equivalent to the inner dimensions of the box constituting the chassis, is placed on said protrusions with the component side, toward the earlier installed circuit board 11. The connectors of the circuit board 10 become at the same time connected to the respective connectors of the circuit board 11 placed earlier on the bottom of the box, whereby the circuit boards are electrically interconnected. Thereafter, the tongues 7 cut on the marginal parts 3 and 4 are bent toward the interior of the box, whereby a reliable fixing of the circuit board 10 to the chassis structure is formed, as shown in FIG. 2. The notches 6 in one of the end parts 4 are intended for various connectors and shafts of such controls and switches as may be required. These may be power, mic, ear and, perhaps, handset connectors.

In the next step, metallic shield covers 13 and 14 which provide protection against electromagnetic interference are attached. The shielding of the circuit board 11 may comprise several smaller covers 13, whereas the shield cover 14 positioned on the side of the circuit board 10 covers as an integral plate the entire circuit board 10. The shield covers are known in themselves in the art as to their design. They are sheets with bent edges, that cling in position by the action of these elastic bonds. In the present instance they attach to the side walls 3 and 4 of the box-like chassis and/or to the strip-like parts 5. All functional circuit components requiring radio frequency shielding are located on the circuit board 11, the RF shielding of the various functional blocks on the circuit board being composed of the ground foil of the circuit board 11, of the strip-like part 5 and the shield cover 13.

Testing the radio telephone can be carried out part by part both before and after attaching the shield covers 13 and 14. After the shield covers have been mounted, the radio telephone is a fully functional module, around which the plastic shell intended for the particular product can be mounted.

The chassis of the invention affords a number of advantages in comparison with the designs known in the art. Being made of tinned sheet metal, it is inexpensive in comparison with an aluminium chassis: its cost is only about one tenth of the price of an aluminium chassis. While the board blank 1 is being processed in the punching press, all requisite elements are fixed to the circuit boards. The completed circuit boards are rapidly mounted on the chassis, using no screws whatsoever. After the circuit boards have been attached to the chassis, a fully operative radio telephone has been created, which can be used as a module for various radio telephones which differ in their external design. The circuit boards serve as walls of the module, and the sheet metal chassis constitutes the other walls. The structure is light and rigid at the same time.

We claim:

1. A radio telephone chassis on which a first and second circuit board with components fixed thereto are mounted, comprising:
    a box-like body formed by cutting off square areas at the corners of a rectangular board blank to form marginal parts and bending the marginal parts by 90 degrees in the same direction, whereby a first set of side walls is formed;
    the box-like body having a bottom formed by strip-like parts created by punching out areas of the board blank and bending nearly the entire the part of the remaining material strips 90 degrees about their longitudinal axes so that said parts are parallel to at least one side wall, the first circuit board being mounted on said bent strip-like parts; and
    the height of said strip-like parts is equal to or greater than the height of the component extending farthest from the surface of the first circuit board.

2. A radio telephone chassis according to claim 1 wherein the box-like body is coated with a thin tin layer.

3. A radio telephone chassis according to claim 2 wherein the corners defined by the first set of side walls are formed by soldering the marginal parts together along the corners defined by the cut-out areas.

4. A radio telephone chassis according to claim 3 wherein at least one of said first set of side walls is provided with notches.

5. A radio telephone chassis according to claim 4 wherein at least a second of said first set of side walls is provided with protrusions and tongues extending toward the interior of the box-like body, the distance of the protrusions from the related tongue being substantially the same as the thickness of a circuit board.

6. A radio telephone chassis according to claim 5 wherein a first circuit board mounted on the bottom of said box-like body and a second circuit board mounted on the protrusions and tongues of the first set of side walls form a second set of side walls.

7. A radio telephone chassis according to claim 6 wherein the first and second circuit boards are covered with one or several shield covers.

8. A procedure for manufacturing a radio telephone chassis and for mounting circuit boards on the chassis, comprising the steps of:
cutting off square areas at the corners of a rectangular board blank outside of an imaginary line connecting inner corners on the board blank to form side and end marginal areas;
punching out areas of the board blank within the imaginary line such that only strip-like parts are left over in the board blank in that area;
bending the entire surface of the strip-like parts 90 degrees about their longitudinal axis so that said parts are parallel to at least one edge of the board blank; and
bending the marginal parts by 90 degrees in the same direction as the strip like parts, whereby a box-like radio telephone chassis with side walls formed by the side and end marginal parts and a bottom with strip-like parts is created.

9. A procedure according to claim 8 further comprising the step of forming notches in one of said marginal parts of the board blank between the imaginary line and at least one edge of the board blank.

10. A procedure according to claim 9 further comprising the step of punching out a plurality of tongues in at least another of said marginal areas along the edge of the board blank and punching out a plurality of protrusions in the other marginal area of the board blank between the imaginary line and edge of the board blank, perpendicular to the one edge, the difference in the distance of the protrusions from the related imaginary line and the distance of the tongues from the related imaginary line being substantially the same as the thickness of a circuit board.

11. A procedure according to claim 10 further comprising the step of coating the board blank with a thin tin layer.

12. A procedure according to claim 11 further comprising the steps of:
supporting a first circuit board with connector means and components fixed thereto on the bottom of the boxed-like chassis by means of the strip-like parts and the side walls;
soldering, at least in part, the circuit board to the strip-like parts and to the side walls;
soldering the marginal parts together along the corners defined by the cut-out areas;
soldering a cooling fin to the outer surface of one of the side walls;
placing a second circuit board within the box-like chassis, said second circuit board having connector means and a component carrying side which is placed so that it will rest on the protrusions; and
bending the tongues over the second circuit board, whereby the second circuit board is interposed between the pairs of tongues and protrusions and against the side walls.

13. A procedure according to claim 12 further comprising the step of coupling the connector means on the second circuit board with the respective connector means on the first circuit board.

14. A procedure according to claim 13 further comprising the step of covering the first and second circuit boards with one or more shield covers, the shield covers shielding said circuit board against electromagnetic radiation.

* * * * *